Patented Sept. 5, 1922.

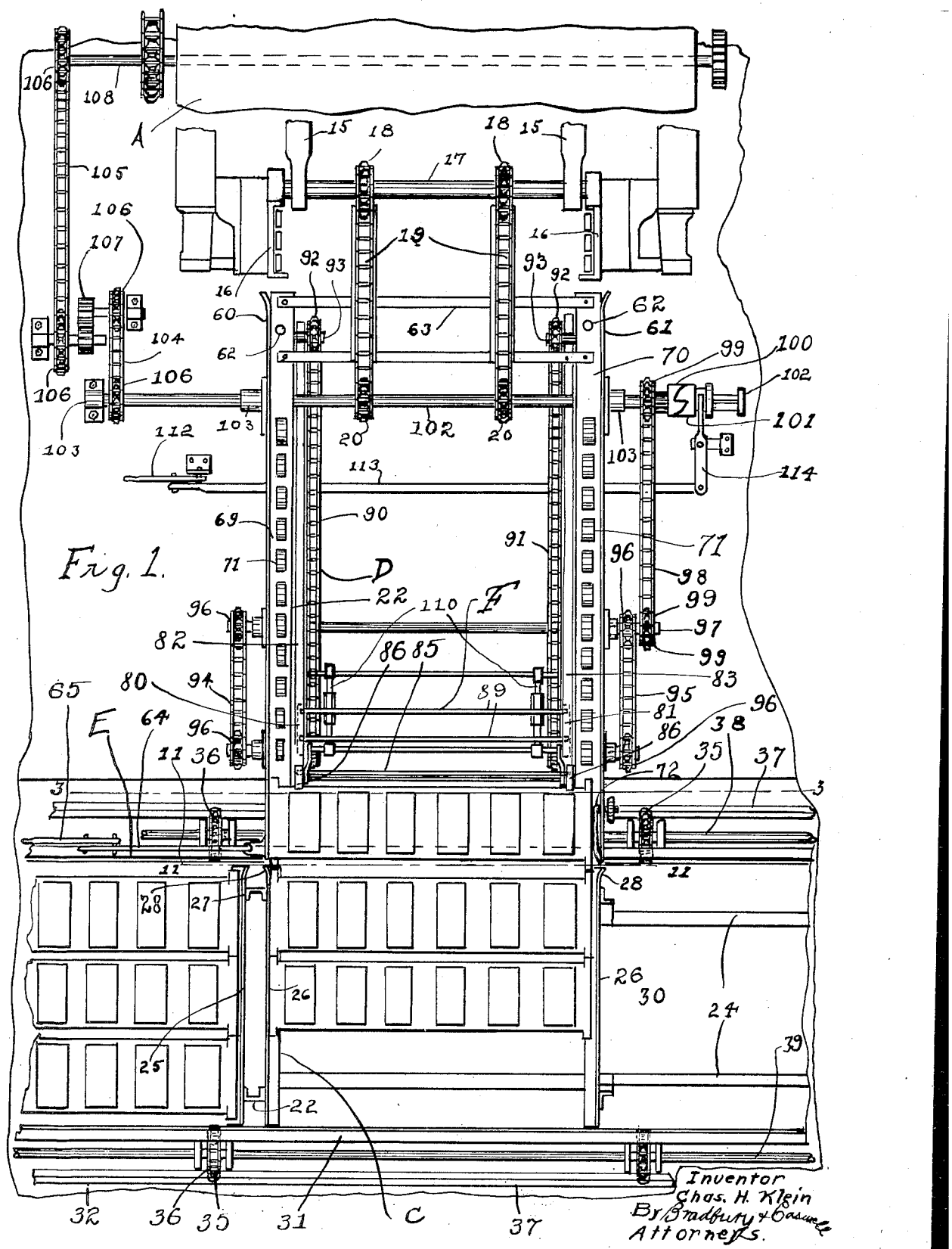

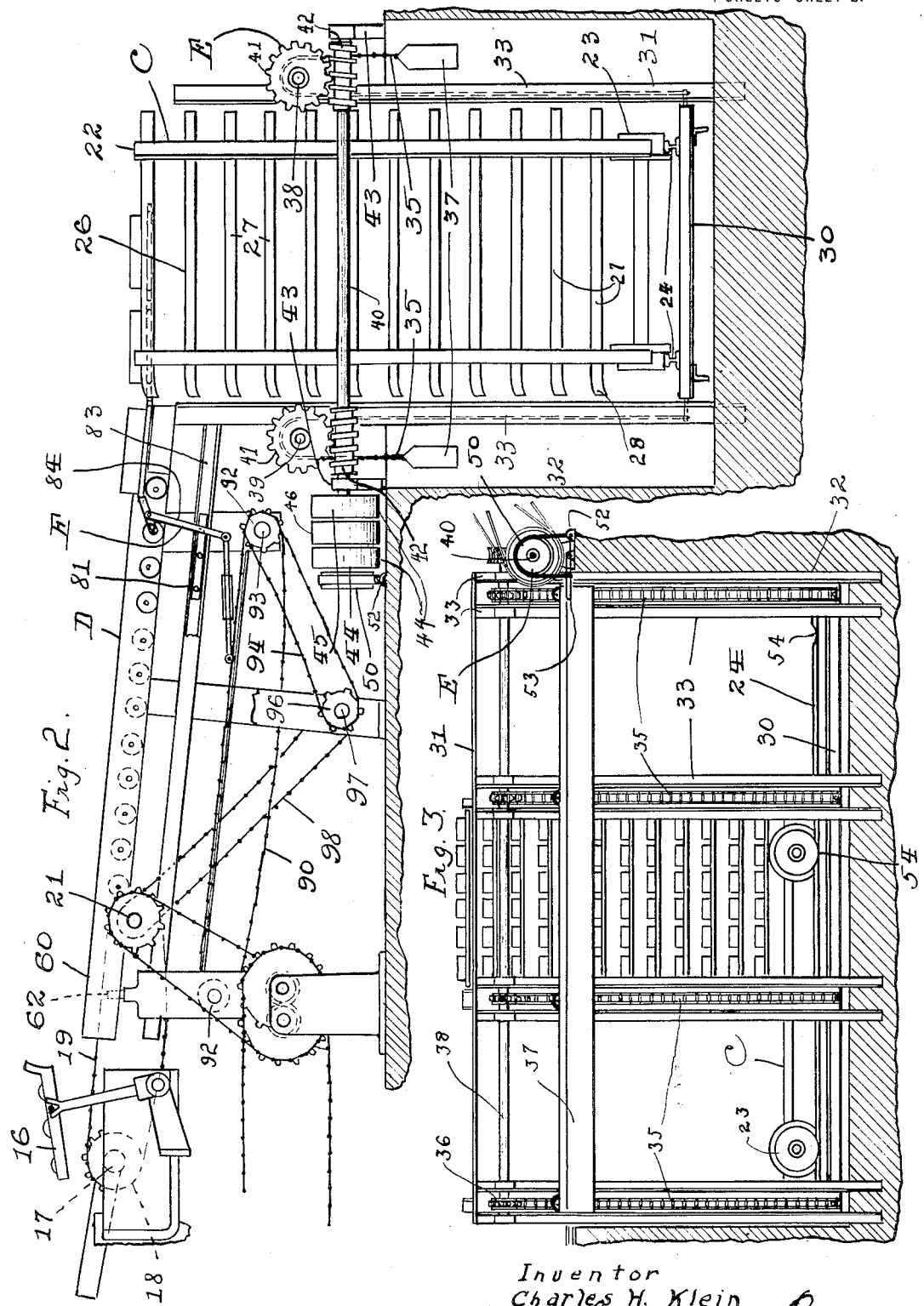

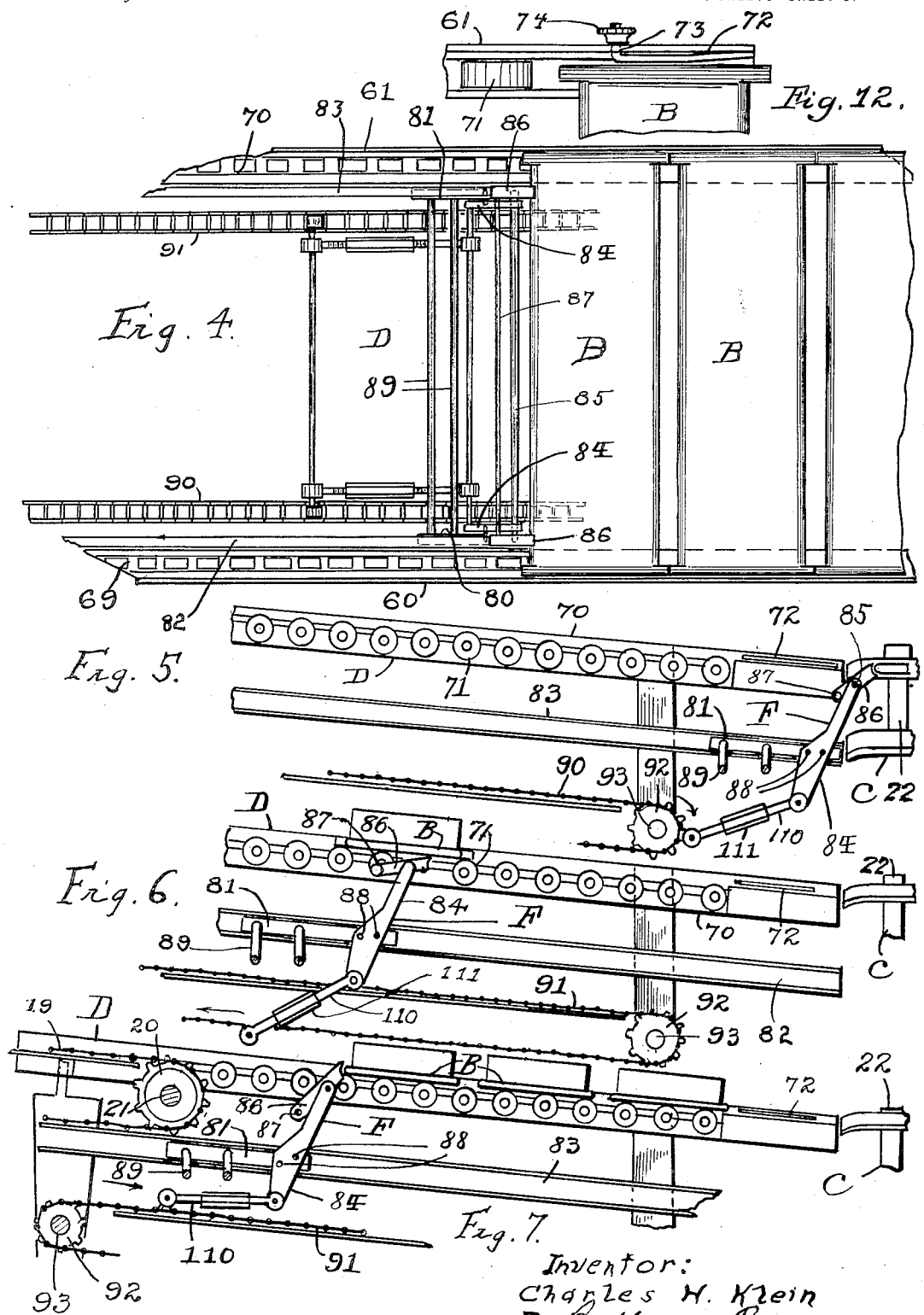

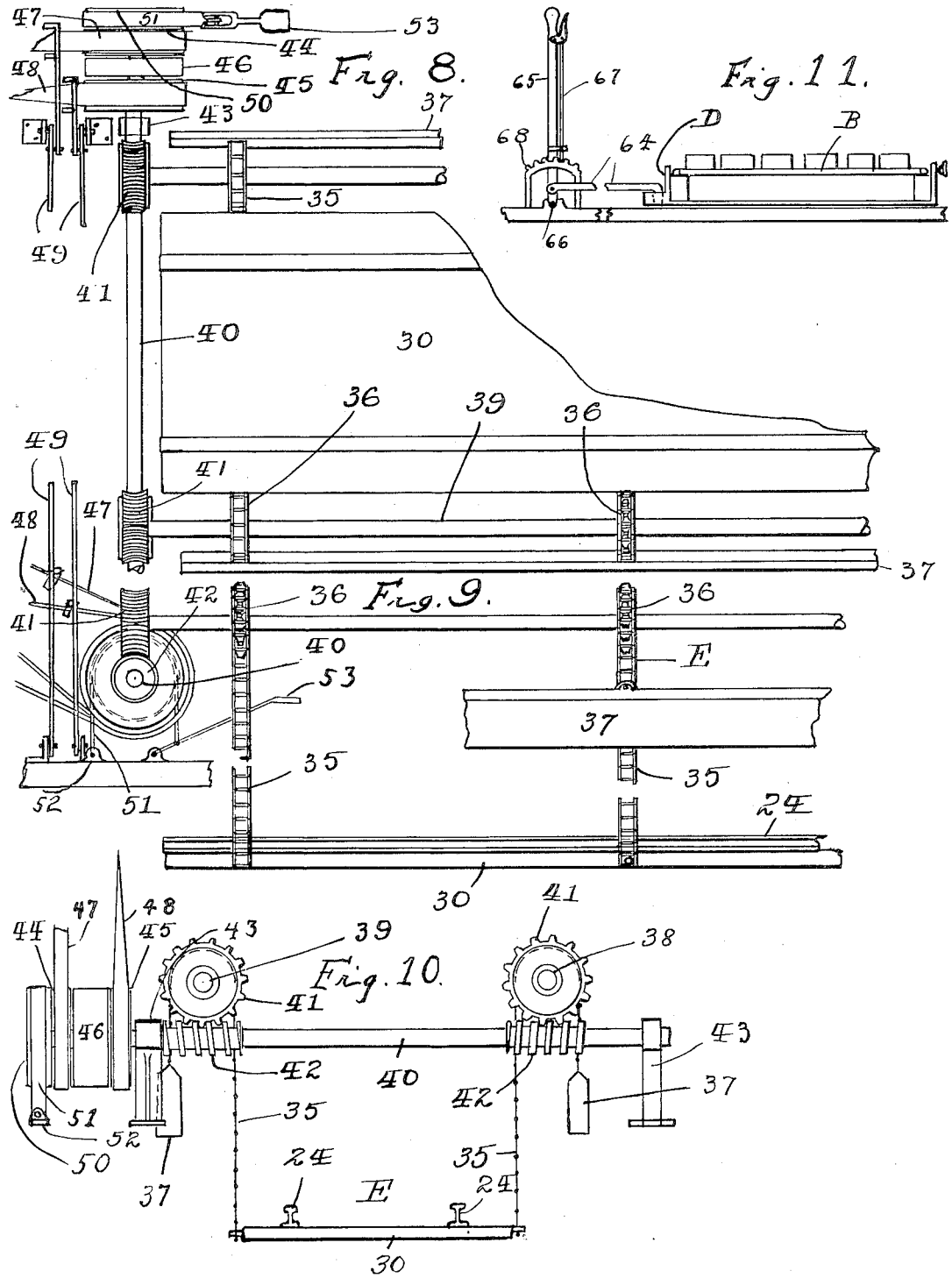

1,427,825

UNITED STATES PATENT OFFICE.

CHARLES H. KLEIN, OF CHASKA, MINNESOTA.

MACHINE FOR AUTOMATICALLY LOADING BRICKS ON PALLETS INTO RACK DRIER CARS.

Application filed August 26, 1919. Serial No. 319,984.

*To all whom it may concern:*

Be it known that I, CHARLES H. KLEIN, a citizen of the United States, residing at Chaska, in the county of Carver and State of Minnesota, have invented a new and useful Improvement in Machines for Automatically Loading Bricks on Pallets into Rack Drier Cars, of which the following is a specification.

This invention has for its primary object to provide means for loading bricks on pallets as they are produced by a brick press onto drier cars so that said cars can be moved into and out of registration with the loader to receive the pallets of bricks and move them into a drier where they are exposed to a drying medium before they are passed into the drier or drying kiln. Heretofore it has been customary to place the pallets of bricks as they are received from the brick press onto a conveyor and then transfer the bricks by hand onto drier cars or into the drier, where they are stacked by hand. This hand labor is expensive and it is the primary object of this invention to reduce to a minimum the utilization of hand labor in the handling of bricks after they have been produced by the press and until they are placed in the drier or kiln. More particularly my invention is adapted to place groups of pallets loaded with bricks on superimposed shelves on trucks thus facilitating in an automatic manner the arrangement of the pallets of bricks on the trucks so that they may be most effectively exposed to the drying medium. My invention further is adapted to provide against contingencies so that whenever a defective pallet loaded with bricks is produced by the brick press which occasionally happens, such defective pallet may be removed and the operation of the loader continued without materially delaying the operation of the apparatus and without affecting the arrangement of the pallets loaded with bricks on the drier trucks. My invention also provides means whereby the trucks can be moved into and out of juxtaposition with the drier without delaying the operation of the loader, or stopping or delaying the operation of the brick press. With these and other objects and features of construction in view, my invention comprises the construction and organization of parts as will be hereinafter more particularly described and claimed.

In the accompanying drawings forming part of this specification, Fig. 1 is a plan of my invention, a detail of an ordinary brick press being illustrated with which my invention is shown in co-operative arrangement; Fig. 2 is a side elevation partly in section of the structure illustrated in Fig. 1; Fig. 3 is a section taken on the line 3—3 of Fig. 1; Fig. 4 is a plan of a detail showing a portion of the lower end of the loader with the ejector shown in the act of moving three pallets towards and onto a truck; Fig. 5 is a side elevation partly in section of a detail illustrating the position assumed by the ejector immediately when three of the pallets have been moved onto one of the shelves of the truck and when the ejector is about to start on its return movement; Fig. 6 is a view similar to Fig. 5 showing the ejector as it is moving backward towards starting position; Fig. 7 is another view somewhat similar to Fig. 5 illustrating the ejector at starting position, that is when it engages a group of pallets on the loader to move said group of pallets loaded with bricks onto one of the shelves of the drier truck; Fig. 8 is a plan of a detail showing a portion of the drier car raising and lowering mechanism whereby the drier car is raised or lowered to cause its shelves to be successively moved into registration with the lower end of the loader; Fig. 9 is a side elevation of part of the mechanism illustrated in Fig. 8; Fig. 10 is an end view of the structure illustrated in Fig. 9; Fig. 11 is a section taken on the line 11—11 of Fig. 1, showing the adjusting mechanism for the lower end of the loader, and Fig. 12 is a plan of a detail showing the depressible pallet stop.

My invention is adapted for co-operation with any suitable type of brick press wherein a plurality of bricks are formed by pressure in the mold and the bricks thus formed in green condition placed on pallets, said pallets being pressed in the machine either by hand or automatically as fast as the pallets are loaded by the machine.

As illustrated in the drawings I have shown a portion A of a brick press having the usual mold carrying members 15 which remove the molds in which the bricks have been formed by the press in synchronism with the operation of the press and place the bricks thus molded on a pallet B (see Fig. 4), which previously has been placed upon suitable pallet supports 16 in the usual manner, (see Figs. 1 and 2). This mechanism usually employs a stationary shaft 17, and upon this shaft I place a pair of freely revoluble sprockets 18 which in turn carry a pair of endless chain belts 19 traveling over sprockets 20 on a driving shaft 102, said driving shaft also being provided by my invention and being driven by the press as will be hereinafter set forth. The conveyor belts 19 are so arranged that their upper sides will engage and remove the pallets from the pallet support 16 and deliver them automatically onto my improved loading mechanism.

It will be understood that my invention may be made to co-operate with any suitable mechanism for delivering the green bricks from the press, the pair of belts 19 constituting only one convenient form of means for receiving the pallets of bricks and transferring them onto the loader in sychronism with the operation of the press.

The drier trucks C employed for co-operation with my invention may be of any construction desired, the object being to provide a truck which will receive the pallets loaded with bricks from the loading mechanism and which when loaded may be moved into a drier. One type of truck which may be employed is illustrated in the drawings and comprises a suitable skeleton frame work 22 mounted upon carrier wheels 23 which are adapted to move on track rails 24 portions of which are for guiding the trucks into and out of my improved loading mechanism and away from the loading mechanism into a drier or kiln or both. The truck disclosed is of double form, that is, it is provided with two separate and distinct tiers of shelves 25 and 26, (see Fig. 1), each tier being produced by superimposed pairs of shelf rails 27 (see Fig. 2) extending transversely across the truck so that the pallets loaded with bricks may be loaded from one side of the truck onto either tier of shelves. The ends of each pair of shelf rails at one side of the truck adjacent to the loader diverge outwardly apart, and downwardly to produce guides 28 to facilitate guiding the pallets on to the shelves from the loader.

Each truck C which as before stated is of double form in the drawings but which may be of single form when desired, is movable into and out of registering position with my improved loading mechanism D which is interposed between the press A and the truck, suitable elevating and lowering mechanism E being provided for holding the truck with its shelves in registration with the loading mechanism to receive and position pallets in groups on each shelf. The raising and lowering mechanism comprises a platform 30 or elevator upon the floor of which a portion of the guiding rails 24 are mounted.

A skeleton frame work 31 is provided which in practice I have arranged in a suitable pit 32 in the ground said frame work being provided with suitable vertical guides 33 between which the car platform 30 in horizontal position is adapted to travel up and down. The car platform is supported at its sides by chain belts 35 which travel upwardly and over driving sprocket wheels 36 and carry a counter-weight 37 at each side of the frame structure so as to reduce to a minimum the weight necessary to be raised.

The sprocket wheels are mounted upon drive shafts 38 and 39 journaled in portions of the upper end of the frame work 31 near each side of the platform. Thus by revolving the shafts 38 and 39 the car platform can be raised or lowered as desired. The two shafts 38 and 39 are revolved in opposite directions to simultaneously raise or lower the car platform by means of a main driving shaft 40, which is coupled to the shafts 38 and 39 by worm gears 41 and worm pinions 42, said main driving shaft being suitably journaled in the journal supports 43 (see Fig. 2) near one end of the frame work. A pair of loose pulleys 44 and 45 and an interposed tight pulley 46 on the shaft 40 and a pair of oppositely driven belts 47 and 48 provide driving power for the shaft 40 in either forward or backward direction according to which position the belts assume in relation to the pulleys, a suitable hand operable belt shift 49 being provided for changing the position of the belts on the pulleys to drive the main shaft forwardly or backwardly or permit the shaft to stop revolving. The main driving shaft 40 is also provided with a brake pulley 50 over which a band 51 engages to stop the shaft revolving as soon as braking power is applied. One end of the brake band 51 is anchored to a support 52 and its free end is connected to a foot lever 53 so that braking power can be applied or released by the application or removal of the foot from said lever. Thus the elevator platform with the pallet holding truck thereon can be elevated or lowered as desired and instantly brought to a stationary position when adjusted by the operator, in a simple and effective manner.

To hold the truck against rolling freely on the rails 24 when adjusted longitudinally suitable depressions or notches 54 are provided in said rails so as to hold the wheels 23 of the truck against unintentional revolution. When the truck is thus engaged in one of its positions on the platform the trays may be loaded successively as the truck platform is received and if one section of the truck has thus been loaded the truck can be moved so that the other section occupies the previous position of the first section and its trays successively loaded with pallets as the truck platform is raised. Thus a complete cycle of loading one of the trucks C is produced first by successively lowering the truck then moving the truck along the platform a distance of one of its sections and finally raising the platform step by step to cause the registration of the trays successively with the loading mechanism.

The loading mechanism D includes in its structure a pair of side frames 60 and 61 pivotally supported at 62 in parallel relation with their pivoted ends adjacent to the press so that their free ends which terminate adjacent to the elevating mechanism E may be swung horizontally for the purpose of moving the free end of the loading mechanism into accurate registration with the shelves of the trucks and thus compensate for any uneven structure. The side frames 60 and 61 are cross braced by suitable members 63 and the free ends of the side frames are swung into adjusted position by the link 64 and lever handle 65, (see Fig. 11) said lever handle being pivotally supported at 66 near its lower end and locked in selected position by the hand operable lock bar 67 which is adapted to engage with the teeth of the quadrant 68. The upper portions of the side frames 60 and 61 are formed by a pair of parallel guide rails 69 and 70 in which are series of antifriction carrier rollers 71, said rails being inclined downwardly from their receiving ends adjacent to the press to their delivery ends which terminate adjacent to a side of a truck which is loaded on the elevating platform 30. When a truck is loaded on the platform the delivery ends of the rails 69 and 70 register approximately with the shelves of one of the sections of the truck, accurate lateral registration being brought about by the adjustment of the hand operable lever 65. The accurate registration in elevation of any shelf on the truck is produced by raising or lowering the platform 30 through the manipulation of the hand operable shifter 49 and the foot brake operating lever 53 in the manner before described. One of the side rails 70 of the loader is provided at its delivery end with a spring retarder 72 (see Fig. 12) which is adapted to exert spring pressure inwardly against one end of the lowermost pallet B on the loading rails. Thus when a pallet is placed on the receiving end of the rails 69 and 70 it is adapted to travel downwardly by gravity on the guide rails and to be held stationary at the delivery ends thereof. Pallets which follow the first descending pallet on the guide rails collect against the first pallet thus forming a group.

The means for ejecting a group of pallets comprises a suitable ejector F which is adapted to operate in synchronism with the operation with the press, to eject pallets every time three pallets collect on the loading mechanism thus filling a shelf on the truck at every operation. The spring retarder as stated is in the form of an arm secured at one end to the side of the guide rail 70 and freely disposed at its upper free end through an opening 73 in the side of the rail near which it is adjusted by a thumb nut 74 which is threaded on the outer end of the retarder to regulate the movement of the retarder and its strength.

The ejector F is composed of a pair of oppositely arranged slides 80 and 81 which are disposed in a pair of inwardly facing channel track bars 82 and 83. These guide rails are mounted upon the sides 60 and 61 so that they may reciprocate freely back and forth between the press and the truck. Each of the slides has rigidly secured thereto an upwardly and downwardly extending arm 84 and the upper ends of these arms carry a transverse shaft 85 upon which is freely swung a pair of dogs 86 which are adapted to engage the edge of the pallet facing the press to slide the series of pallets which rest upon the rails 69 and 70 on to the shelf of the truck which happens to register with the ends of said rails. The lower ends of the dogs 86 are secured to a transverse shaft 87 which normally rests by gravity against the rearward edges of the supporting arms 84. When in this normal position the upper ends of the dogs will engage the rearward edge of a pallet to move the pallets downwardly onto the truck shelf when the guides 80 and 81 slide downwardly along the channel members 82 and 83. When the guides slide upwardly in said channel members the upper ends of the dogs will sweep freely below any pallets which are sliding down the track rails 69 and 70. A pair of transverse bars 88 secure the supports 84 rigidly to the guides 80 and 81 so that they will act in unison and form a carriage frame-work. The guides 80 and 81 are cross braced by the members 89 to complete said frame work. This carriage frame work is reciprocated back and forth in the track rails 82 and 83 by means of a pair of chain belts 90 and 91 said belts being mounted upon the sprocket wheels 92 which are carried by stub shafts 93 journaled in the sides 60 and 61 of the frame. Two of the stub shafts 93 are driven by chain belts 94 and 95 and sprocket wheels 96, which in turn are driven by driving shaft 97. The driving shaft 97 is revolved by a chain belt 98 and sprocket wheel 99, the sprocket wheels 99 being driven by the driven member 100 of a clutch 101. The driving member of this clutch is keyed to the shaft 102 which is journaled in the supports 103 and driven by the chain belts 104, 105, sprockets 106, gearing 107 and the main driving shaft 108 of the press A so that the driving belts 90 and 91 will actuate the ejector in synchronism with the operation of the press and engage and eject the number of pallets desired which for illustration, as shown, are three, every time they collect at the lower end of the rails 60 and 61 and force the cluster of pallets past the retarder 72 on to the shelf of the truck which registers with the lower ends of the rails 60 and 61.

In operation the conveyor belts 19 transfer the pallets positively from the mold unloading mechanism of the press above described onto the carrier rails 69 and 70 from whence they descend by gravity along said rails and congregate in groups of three at the lower ends of the rails, whereupon the ejecting dogs engage the uppermost pallets of the group and force the pallets onto the shelf of a truck. The belts 90 and 91 are connected with the lower ends of the supporting arms 84 by means of the pitman rods 110, each of said pitman rods being adjustable in length by a turn buckle 111 and pivotally secured to the belts so that the rotary movement of the belts 90 and 91 is converted into the reciprocating motion of the ejecting dogs 86. As the shelves of the trucks are loaded the elevating platform is operated by manipulating the clutch shift 49 and the brake member 53, that is, after a truck has been moved on to the platform into position so that one side will rest in front of the loading apparatus with the wheels 23 of the truck engaged in the depressions 54 in the rails, the truck platform is lowered step by step so that the shelves will be successively loaded with the pallets of bricks. After the entire set of shelves on one side of the truck has been loaded the truck is moved longitudinally on the platform 30 a step until the empty side is directly in front of the loading apparatus whereupon the platform is raised step by step until all of the empty shelves of the truck have registered successively with the lower ends of the rails 69 and 70 and have been loaded with the pallets. When all of the shelves have been loaded the platform is moved so that it will lie level with the surface of the ground and the sections of rails 24 connect with similarly disposed rails on the ground whereupon the truck can be moved away and replaced by an empty truck to be loaded on the platform. In the event any of the pallets are imperfectly loaded with bricks either in the brick press or before entering its shelf on the truck the loading apparatus can be stopped instantly by shifting a lever 112, which is connected by the rod 113 with the clutch shifting arm 114, said clutch shifting arm being connected with the driving member of the clutch 101. In this manner the driving member is slid out of connection with the driven member 100 and disconnected from the driving shaft 102.

In accordance with the patent statutes I have described the principles of operation of my invention together with the apparatus which I now consider to represent the best embodiment thereof, but I desire to have it understood that the construction shown is only illustrative and that the invention can be carried out by other means and applied to uses other than those above set forth within the scope of the following claims.

Having described my invention, what I claim as new and desire to protect by Letters Patent is:

1. The combination with a brick press adapted to deliver brick laden pallets, one after the other, of pallet transporting mechanism, a conveyor between the press and said transporting mechanism arranged to receive the loaded pallets as they issue singly from the press, said conveyor being adapted to accumulate said pallets, edge to edge, thereon, and ejecting means, timed to accord with the output of the press, adapted upon one working thrust thereof to push a completed group of pallets of a given number from the delivery end of said conveyor onto said pallet transporting mechanism.

2. The combination with a brick press adapted to deliver brick laden pallets, of a truck element having superimposed shelves adapted to receive and hold the loaded pallets, a conveyor element for receiving the loaded pallets from the press and carrying the same toward position of discharge, where the advance pallets accumulate in groups by gravity, means for pushing the grouped pallets from the conveyor element to a shelf of the truck element and means for moving one of said elements so that any one of the shelves on the truck element may be brought into registration with the delivery end of said conveyor element.

3. In a device of the class described, a conveyor for receiving and carrying a plurality of loaded pallets from a brick press, as they are delivered one at a time therefrom, said conveyor being adapted to accumulate, by gravity, the advance pallets in groups of given numbers, a reciprocating ejector moved to accord with the operation of the press and adapted, upon each actuation thereof, to eject the grouped pallets from the conveyor, and shelves movably arranged at the delivery end of said conveyor, each shelf being designed to receive a group of pallets.

4. The combination with a brick press adapted to discharge brick laden pallets therefrom, of a loader including a power driven conveyor element and a gravity conveyor element, the former being adapted to receive loaded pallets from the press and deliver the same to said latter element, a stop at the lower extremity of the gravity element for releasably holding the pallets and causing them to accumulate in groups thereon, and an ejector adapted to periodically engage the accumulated pallets and move them past said stop, said power driven conveyor element and ejector being propelled in synchronism with the operation of the press, whereby interference between pallets at the receiving end of the loader is avoided and uniform groups of pallets are ejected at the delivery end thereof.

5. In a device of the class described, the combination with a brick press adapted to deliver brick laden pallets, of a conveyor including a gravity element adapted to accumulate said pallets in groups at the delivery end thereof, an ejector for pushing groups of pallets from the conveyor, said conveyor also including a power driven element arranged to receive the pallets, one at a time, from the press and start them in their travel upon said gravity element.

6. The combination with a brick press adapted to discharge brick laden pallets, one at a time, therefrom, of a conveyor adapted to receive a plurality of loaded pallets and accumulate the advance pallets in groups thereon, an ejector driven in synchronism with the operation of the press and adapted to eject the grouped pallets from the conveyor, means for arresting the movement of the ejector so that the ejection of incomplete groups may be avoided, when the output of the press is interrupted and shelves movably arranged at the delivery end of the conveyor, each shelf being designed to receive a group of pallets.

7. In a device of the class described, the combination with a brick press adapted to deliver brick laden pallets, of a conveyor designed to receive a plurality of loaded pallets, said conveyor comprising a power driven element and a gravity element, the former being adapted to carry the loaded pallets from the press to the latter, while the latter is adapted to accumulate, by gravity, the advance pallets in groups at the delivery end of the conveyor, and a power driven ejector arranged to push the grouped pallets from the conveyor, said power driven conveyor element and ejector being timed in their operation with respect to each other and to the press.

8. The combination with a brick press adapted to deliver brick laden pallets, of a conveyor designed to receive the loaded pallets and support a plurality thereof in travel from the press, means on said conveyor to cause the accumulation of pallets, as the same advance by gravity, a truck having superimposed shelves, each shelf being adapted to receive and hold a cluster of loaded pallets, means for changing the elevation of the truck, whereby the shelves are caused to register individually with the delivery end of said conveyor and an ejector for pushing each cluster of pallets, as it is completed, from the conveyor onto the shelf of the truck which is in registration with the delivery end of the conveyor.

9. The combination with a brick press adapted to discharge brick laden pallets therefrom, of a conveyor designed to receive the loaded pallets and convey them away from the press, a truck having superimposed shelves adapted to register with the delivery end of said conveyor, means for accumulating the leading gravity propelled pallets in groups at the delivery end of the conveyor, means for changing the elevation of the truck whereby any one of its shelves may be brought into registration with the delivery end of said conveyor, each of the shelves of said truck being adapted to accommodate a predetermined number or group of pallets and means acting in synchronism with the operation of the press for ejecting the grouped pallets from the conveyor and pushing them onto the shelves of the truck.

10. The combination with a brick press adapted to deliver brick laden pallets, of a conveyor adapted to receive the pallets from the press, a truck having a shelf adapted to receive a loaded pallet, said truck being movable into loading position in roughly approximate registration with the delivery end of said conveyor and means for adjusting the end of said conveyor adjacent to said truck into substantially accurate registration with the shelf of said truck.

11. The combination with a brick press adapted to deliver brick laden pallets, of a conveyor adapted to receive the loaded pallets, a truck having superimposed shelves, said truck being movable laterally with respect to the conveyor and into and out of approximate loading position at the delivery end of said conveyor, means for changing the elevation of the truck, whereby its shelves may be brought successively into proper elevation to receive the pallets, and means for adjusting the delivery end of the conveyor laterally to obtain accurate registration of the same with said shelves.

12. The combination with a brick press adapted to deliver brick laden pallets, of a conveyor adapted to receive the loaded pallets, said conveyor having its delivery end movable laterally, a truck having superimposed shelves adjacent to the delivery end of said conveyor, means for changing the elevation of the truck whereby its shelves may be brought successively into registration with the delivery end of said conveyor to receive the pallets therefrom, the shelves of said truck being provided with sides and means for moving the delivery end of said conveyor laterally to cause said conveyor to direct the pallets between the sides of said shelves.

13. The combination with a brick press adapted to discharge brick laden pallets, a gravity conveyor adapted to receive and guide the loaded pallets downwardly, a depressible stop at the lower end of said conveyor arranged to releasably hold pallets and cause them to accumulate on said conveyor and a reciprocable ejector adapted to periodically engage the accumulated pallets and move them past said stop from the conveyor.

14. The combination with a brick press adapted to discharge brick laden pallets at frequent intervals, one after the other, of a conveyor adapted to receive a plurality of the loaded pallets and accumulate the leading pallets in groups at a point removed from the receiving end of said conveyor, a reciprocable ejector including a pusher member timed in accordance with the operation of the press to engage the last pallet of a group as the same is completed and to eject the grouped pallets from the conveyor, and shelves movably arranged at the delivery end of the conveyor, each shelf being adapted to receive a group of pallets from said conveyor.

15. In a device of the class described, the combination with a brick press adapted to deliver brick laden pallets, one at a time and at regular intervals, of a conveyor designed to receive said pallets and accumulate them, edge to edge, in groups and a reciprocating member timed with respect to the operation of the press, said member being adapted to eject a group of pallets from the conveyor on its forward throw and return to starting point as the last pallet of a new group completes said group.

16. In a device of the class described, the combination with a brick press adapted to deliver brick laden pallets, of a conveyor designed to receive said pallets, one after another, and accumulate them, edge to edge, in groups on the conveyor at a position removed from said press and a reciprocating ejector including a yielding dog, said ejector being timed with respect to the operation of the press and adapted to push groups of pallets from the conveyor, said yielding dog in the working throw of the ejector being designed to engage the rear edge of the last pallet of a group in the course of ejectment and during its return for another group adapted to be depressed by sliding engagement with the lower sides of the pallets accumulating to form the next group.

In testimony whereof, I have signed my name to this specification.

CHARLES H. KLEIN.